April 12, 1927.  J. O. CARROLL  1,624,157

BALING WIRE TIER

Filed July 8, 1925    4 Sheets-Sheet 2

Inventor

J. O. Carroll

By Lacey & Lacey, Attorneys

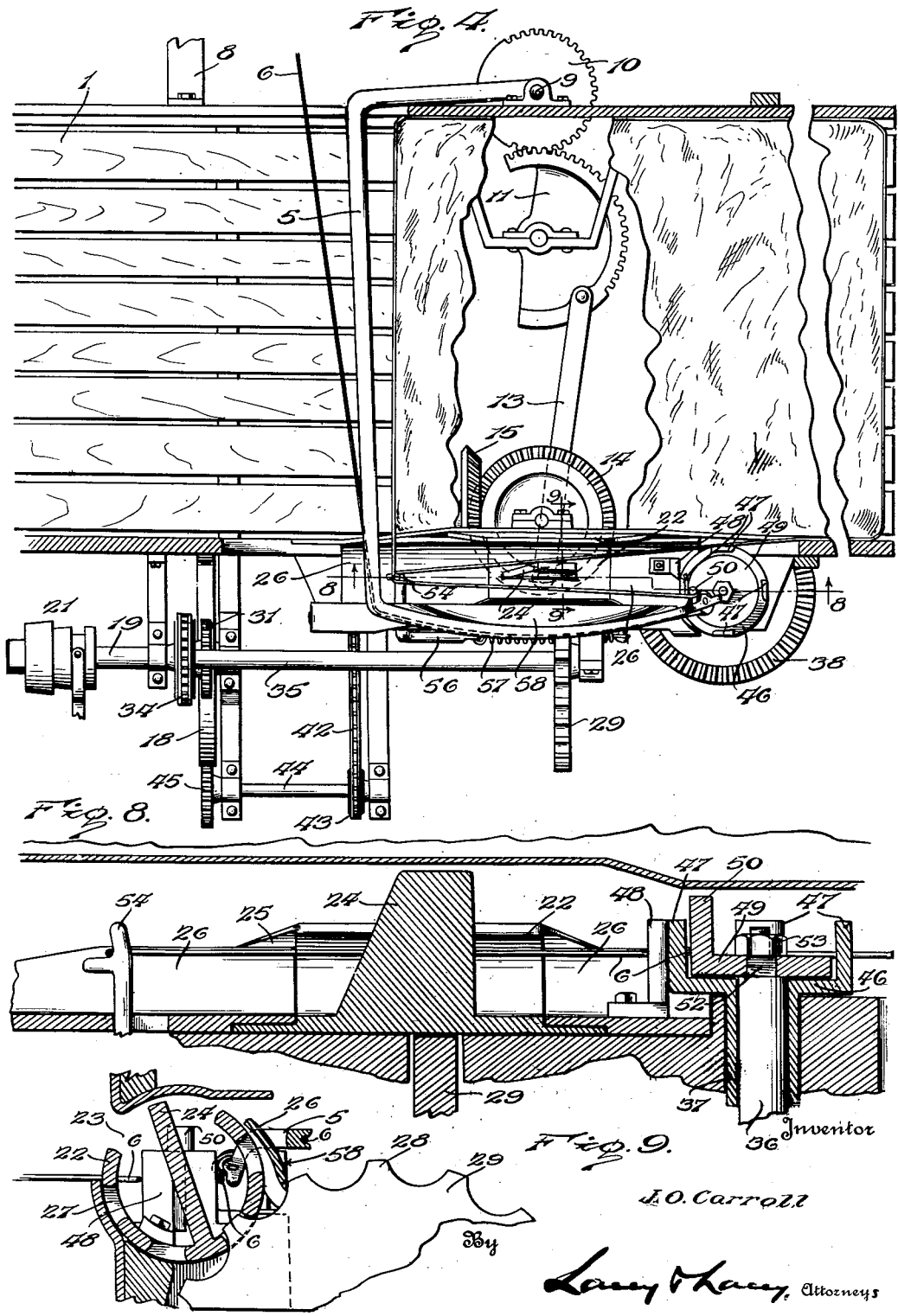

April 12, 1927.
J. O. CARROLL
BALING WIRE TIER
Filed July 8, 1925   4 Sheets-Sheet 4
1,624,157
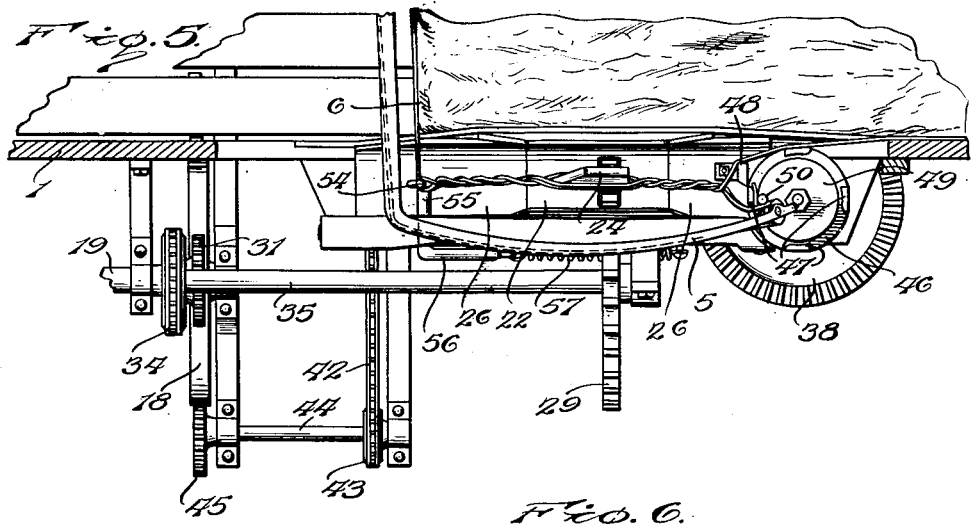
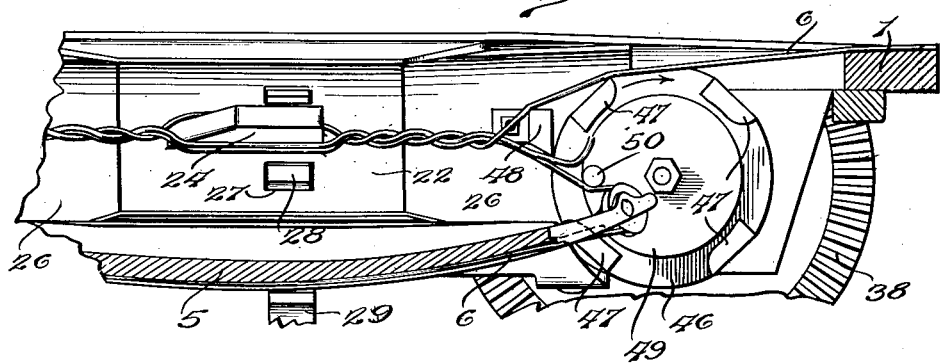
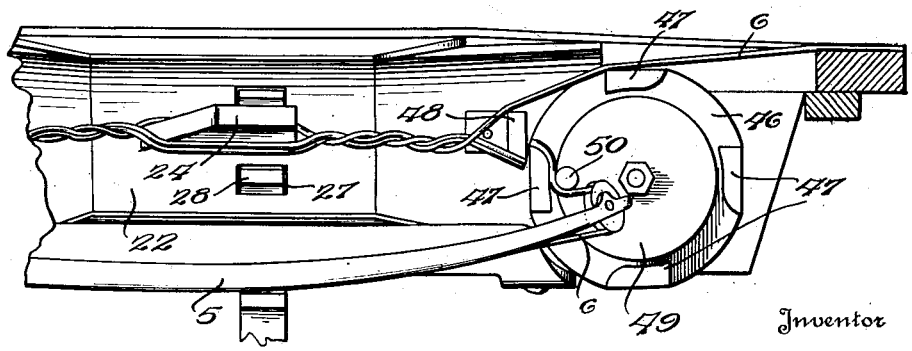
Inventor
J. O. Carroll
By Lacy & Lacy, Attorneys Patented Apr. 12, 1927.

1,624,157

UNITED STATES PATENT OFFICE.

JAMES O. CARROLL, OF PITTSFIELD, ILLINOIS, ASSIGNOR OF FIFTY-ONE PER CENT TO CHARLES P. CARROLL, OF KANSAS CITY, MISSOURI.

BALING-WIRE TIER.

Application filed July 8, 1925. Serial No. 42,332.

The invention relates to means for tying or securing the ends of a wire which is employed to retain in compressed condition hay or other material which has been formed into a bale. The invention has for its object the provision of a simple and compact mechanism whereby the wire will be drawn across the bale and held while the previously severed wire is secured and then cut and the end of the wire held while the length of the wire is placed in position to be carried around a second bale. Other objects of the invention will appear incidentally in the course of the following description, and the invention resides in certain novel features which will be particularly pointed out in the appended claims.

In the accompanying drawings, which illustrate one embodiment of my invention,

Fig. 4 is a view similar to Fig. 1 showing the wire carried entirely around the bale and held in position to permit the securing or tying of the wire;

Fig. 5 is a slightly enlarged plan view of the tying mechanism showing the position after the strands of the wire have been twisted together;

Fig. 6 is a view similar to Fig. 5 showing the twisted wire released and the cutter about to engage the wire so as to sever the same and secure the end of the untwisted wire;

Fig. 7 is a view similar to Fig. 6 but showing the wire severed and the end of the main strand secured to permit the placing of the wire in position to be engaged with a second bale;

Fig. 8 is a longitudinal section on the line 8—8 of Fig. 4, and

Fig. 9 is an enlarged detail transverse section on the line 9—9 of Fig. 4.

Figure 1:
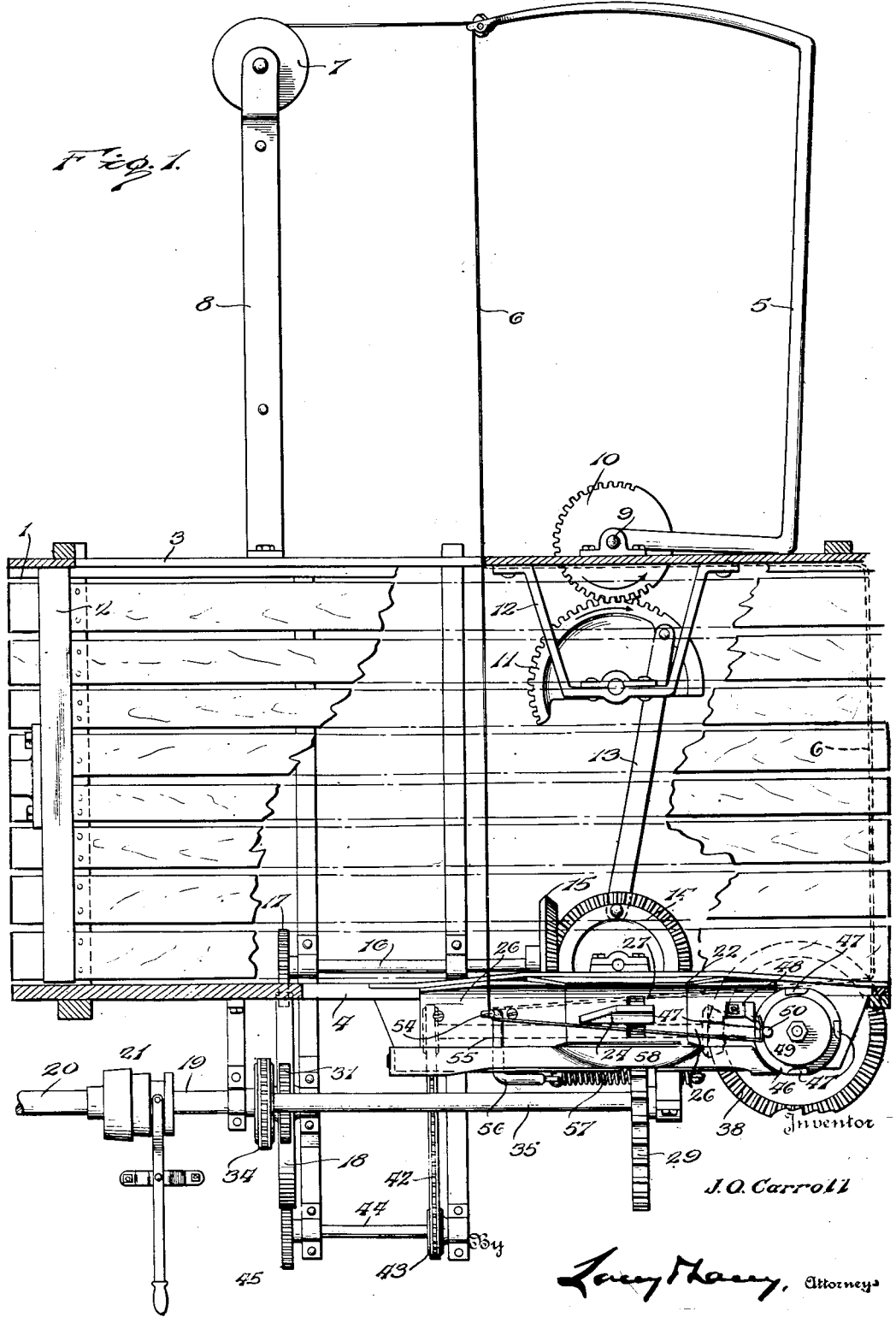
Figure 1 is a top plan view, partly in horizontal section and partly broken away, of a portion of a baling press having my improved wire securing mechanism mounted thereon.

In the drawings, the reference numeral 1 indicates a portion of a baling chamber and 2 denotes a plunger operating therein in the usual manner, the baling chamber being provided with longitudinal slots 3 and 4 in its opposite sides to permit the passage of the needle 5 carrying the baling wire 6 which is supplied from a drum 7 carried by a bracket 8 secured upon the side of the baling press and projecting laterally therefrom. The baling wire is of the usual dimensions and the drum 7, which carries the stock of wire, may be of any approved form and mounted in any convenient manner, the bracket 8 shown in the present drawings being merely a convenient manner of illustrating the device.

Figure 2:
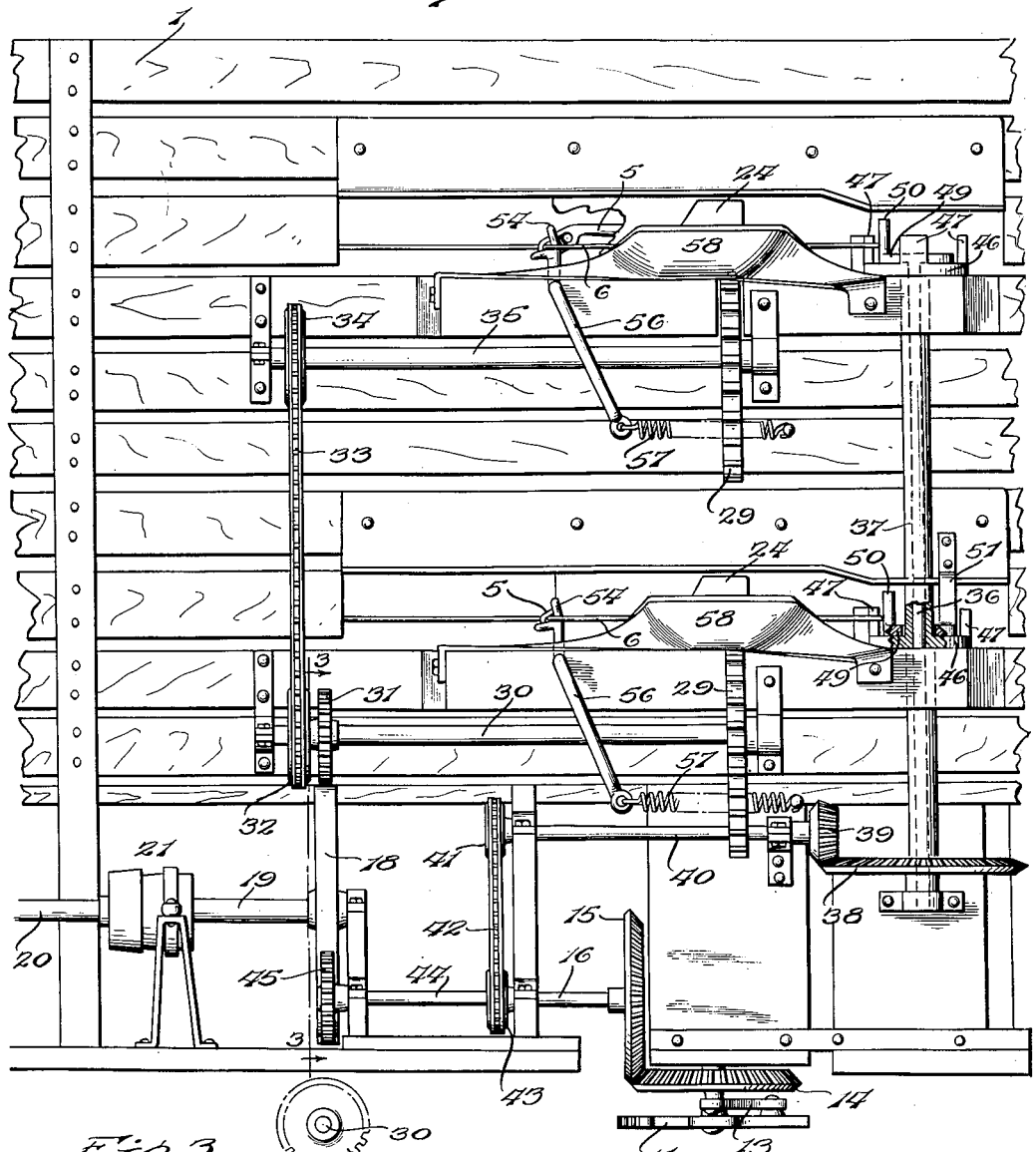
Fig. 2 is a side elevation of the same.
Figure 3:
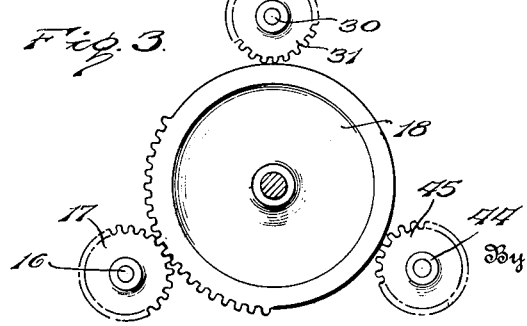
Fig. 3 is a detail section on the line 3—3 of Fig. 2.

The needle 5 may be of any approved form and is carried by a vertically disposed needle shaft 9 which is mounted in suitable bearings upon one side of the baling press and in the present illustration is equipped with a spur gear 10 on its lower end. As will be understood most readily from Fig. 2, a pair of needles is provided so that the baling wires may be passed around the bale above and below the center thereof to more effectually retain the form of the bale. The spur gear 10 meshes with a segmental gear 11 carried by a stub shaft mounted in a suitable bracket 12 on the under side of the baling press, and a connecting rod 13 is disposed transversely below the baling press and has one end pivoted to the said segmental gear and its opposite end pivoted to a beveled gear 14 which is mounted on the bottom of the baling press at the opposite side thereof. The beveled gear 14 meshes with a beveled gear 15 which is carried upon one end of a longitudinally arranged shaft 16 having a pinion 17 at its opposite end. This pinion 17 meshes with a mutilated gear 18 secured upon the driving shaft 19 which is connected with a shaft 20 leading from an engine or other motor through a manually controlled clutch 21, as shown in Fig. 1 and as will be readily understood.

Upon the side of the baling press remote from the needle shaft 9 is mounted the wire tying, holding and cutting mechanisms, and these mechanisms are provided above and below the horizontal center of the baling press but are duplicates in construction, arrangement and operation so that a description of one will suffice for both. Each of said mechanisms comprises a tubular body 22 having an open side and provided midway between its longitudinal edges with a longitudinal rib or tongue 24 at the opposite sides of which the strands of the wire are disposed so that upon rotation of the said body with its tongue the strands will be twisted together and firmly secured. The ends of the tubular twister body 22 are recessed, as indicated at 25, so that they may engage about and be rotatably held in place by the ends of open bearings 26 which are rigidly secured upon the side of the baling press in any convenient or preferred manner. Openings 27 are formed through the wall of the tubular twister body, and these openings are engaged by the peripheral teeth or lugs 28 of an actuating gear 29 which is secured upon the end of a longitudinal shaft 30 carried in suitable bearings upon the side of the baling press and provided adjacent the end thereof remote from the gear 29 with a pinion 31 adapted to at times be actuated by the mutilated gear 18. There is also a sprocket wheel 32 upon the shaft 30 and a chain 33 is trained around the said sprocket wheel and a sprocket 34 upon on upper shaft 35 which corresponds to the shaft 30 and carries a second gear 29. The provision of the sprockets 32 and 34 and the chain 33 causes the shafts 30 and 35 to operate synchronously so that the upper and the lower twisters will operate in unison. When the gear 29 is actuated, the twister body 22 will, of course, be rotated about its own longitudinal axis, and it may be noted at this time that the several gears will be so timed and arranged that the different working instrumentalities will operate in the proper order and for the proper intervals to attain the required results. Usually, the twister body will make three complete revolutions while twisting the wire and will then come to rest and remain at rest while the wire is severed and placed in position for a second operation. During the formation of a bale, the shaft 19 will be disconnected from the shaft 20 by the opening of the clutch 21, and after the bale has been formed the clutch is closed so that the tying and placing of the wire will be accomplished prior to the beginning of a second bale, and when tying and placing of the wire have been completed, the clutch is again opened so that the mechanism of the invention will remain inoperative until a second bale has been formed. It will be noted that the openings 27 in the bale-tying body 22 serve the function of gear teeth and the edges of the wall which define the opening 23 at the opposite sides of the rib or tongue 24 serve the same purpose.

Adjacent one end of the tier or twister body 22, a post 36 is secured upon the side of the baling press in slightly spaced relation thereto, and this post 36 is encircled by and supports a hollow shaft 37 having a beveled gear wheel 38 near its lower end. The wheel 38 meshes with a beveled pinion 39 upon the adjacent end of a longitudinal shaft 40 carried in suitable bearings upon the side of the baling press and at the opposite end of the said shaft is a sprocket pinion 41. A sprocket chain 42 is trained about the said pinion and a similar sprocket pinion 43 which is carried by a shaft 44 and upon which is also secured a pinion 45 so arranged that at times it will be engaged and driven by the mutilated master gear 18. The cutter is formed integral with or rigidly secure to the hollow shaft 37 and comprises a disk 46 having knives 47 formed upon its upper side and spaced equi-distantly upon the same at its periphery, the said knives being arranged to cooperate with a stationary knife 48 which is secured in any convenient manner upon the side of the baling press. Disposed concentric with the shaft 37 is a holding disk 49 from the upper side of which rises a short post or pin 50 arranged to cooperate with the successive cutters 47 to grip and hold the end of the baling wire. The disk 49 is, of course, not secured to the shaft but is held against movement, this result being attained at the lower holder by providing an arm 51 rising from the holder disk and rigidly secured to the side of the press while the upper disk is provided at its center with a flat-sided opening engaged with a flat-sided stud or tenon 52 at the end of the post 36, a nut 53 being threaded onto the terminal of the tenon above the flat-sided portion of the same so as to clamp the disk in place. This arrangement is clearly shown in Fig. 8.

At the end of the twister body remote from the cutter and wire holder is a guide and looping finger 54 formed upon the inner end of a rock shaft 55 which is rotatably mounted below the adjacent bearing 26, the finger rising through the bottom of the said bearing, as will be understood on reference to Fig. 8. At the outer end of the rock shaft 55 is a depending arm 56 to which is attached one end of a contractile spring 57 which has its opposite end secured to the side of the baling press.

In the operation of the device, the wire is threaded through the eye of the needle in the usual manner and carried across the baling chamber, as shown in Fig. 1 in full lines, so that the bale will be formed against the wire. The end of the wire is held by and between the holding pin or post 50 and the side of a cutter 47, as shown clearly in Fig. 1, and on a larger scale in Fig. 7. The needle is then withdrawn so that the wire will be pulled taut from the post 50 through the twister body 22 at the outer side of the rib or tongue 24 and then across the baling chamber, passing at the outer side of the retaining and looping finger 54. As the bale is formed, the portion of the wire passing across the baling chamber will be pushed forward by the bale so that it will assume the form and position shown in dotted lines in Fig. 1, being bent about the looper finger 54 and passing through the twister body 22 at the inner side of the rib or tongue 24. When the bale has reached the desired size, the clutch 21 is closed and the operating mechanism will be set in motion so that the master gear wheel 18 will actuate the pinion 17 and the shaft 16 to rotate the gear 14 and through the same exert a pull upon the pitman or connecting rod 13 which will drive the gears 11 and 10 in the directions indicated by the arrows in Fig. 1. The needle will, consequently, be swung to the position shown in Fig. 4 so that the wire will be carried entirely around the bale and a second strand will be carried through the twister body at the outer side of the rib or tongue 24 therein, the wire being held against the post 50, as shown in Fig. 4. The toothed portion of of the master gear 18 will then have cleared the pinion 17 and immediately meshed with the pinion 31 so that the twister body will be rotated, the rotation of the pinion 31 being transmitted through the shaft 30 to the gear 29 and thence to the twister body, as is obvious. The rotation of the twister body will, of course, continue as long as the teeth of the gear 18 mesh with the teeth of the pinion 31 and when the master gear frees itself from the pinion 31, it will at once mesh with the pinion 45 and, consequently, transmit motion through the shown and described gearing to the hollow post 37 to actuate the cutter, and it will be readily seen that the gearing is so arranged and proportioned that the speed of the shaft 37 will be much less than the speed of the master gear, the shaft 37 being, consequently, driven only through one-fourth of a revolution of the shaft 44. When the wire is twisted by the rotation of the twister body 22 and the tongue 24 of the same, the strands of the wire will, of course, be placed under greatly increased tension so that a strand against which the cutter impacts will be easily severed. When the needle assumes the position shown in Figs. 5, 6 and 7, the wire is carried across the pin or post 50 at the outer side of the wire end which is held between said post and the adjacent cutter 47. Then, when the shaft 37, with the cutter disks 46, is rotated, a succeeding cutter 47 will be brought against the strand of wire between the post 50 and the stationary cutter 48 to sever the wire and simultaneously grip the free end of the strand against the post 50, as will be understood particularly upon reference to Figs. 6 and 7. Immediately after this operation has been performed, the master gear will again engage the pinion 17 and, as a result of such engagement, the gear 14 will be again actuated so as to impart a reverse movement to the connecting rod 13 and, consequently, actuate the gears 11 and 10 to return the needle to its initial position shown in Fig. 1. When the needle returns to initial position, the wire will, of course, be fed out through the needle eye so that it will be drawn through the twister body at the outer side of the rib or tongue therein and then across the baling chamber in the path of the second bale which will be formed, the described operation being then repeated after the second bale is completed. The looper and retaining finger 54 obviously will yieldably hold the body of the wire while it is being twisted and as the tension of the wire increases the finger will yield to the same so that breaking of the wire under the tension will be avoided. The parts are timed so that the severing of the wire by the co-operating cutters 47 and 48 will occur just as the twisted wire reaches its greatest tension and is slipping from the finger 54 under such tension. The spring 57 obviously will expand as the tension of the wire increases so that, while the wire will be held sufficiently taut to be effectively twisted, it cannot be subjected to a breaking strain. Immediately upon the release of the wire, the spring 57 will return the looper finger to its normal position so that as the needle withdraws the wire will be carried across the looper finger as initially described.

My improved bale wire tying and cutting mechanism is very simple and compact and will operate efficiently at all times. The operating mechanism shown and described is one form of many mechanisms which may be employed and occupies very little space upon the baling press and is so arranged that it will not interfere with the movements of the operators and, consequently, will minimize injuries to them, but it is to be understood that any form of driving gearing which will actuate the parts in the proper sequence and for the proper periods of time may be employed without involving any departure from the invention. It may be observed, however, that the mounting for the tubular twister body 22 is preferably provided with a convex outer face 58 on its outer side at its top so that the wire fed from the retracting needle will easily slip over the said mounting and pass into proper position through the twister body. When the twisting operation commences, there will be two strands of wire at the outer side of the rib or tongue 24 and one strand at the inner side of the same so that the twisting will be performed upon three strands, the result being that a very strong twist or tie will be produced and this twist or tie will extend longitudinally of the bale to very effectually resist expansion and loosening thereof. Moreover, the severed end of the tie wire will not project laterally from the bale at substantially a right angle thereto as is the case with many previously employed ties, and persons who are obliged to pass near the bales are, therefore, not apt to be injured through contact with the projecting end of the wire.

It will be understood, of course, that while I have mentioned two needles in the foregoing description, the number of needles may be varied at will according to the dimensions of the press or the desires of the user. Also, that, if preferred, the needles may operate vertically through the baling chamber without requiring any change in the construction of any working parts, and that various changes may be made in minor details without involving any departure from the spirit or scope of the invention as the same is defined in the following claims.

Having thus described the invention, I claim:

1. A mechanism for the purpose set forth comprising a tubular twister body mounted in fixed bearings on the side of a baling press and having an open side, a longitudinally disposed rib fixed in the twister body and extending diametrically across the same to the open side thereof, means for disposing a wire to be tied at opposite sides of the rib and longitudinally within the body, yieldable means near one end of the body and in constant axial alinement therewith for forming a bight in the wire and holding the wire at the bight, and means for rotating the twister body.

2. A mechanism for the purpose set forth comprising a tubular body having its normally upper side open from end to end, a longitudinally extending tongue within the body having its free end disposed at the center of the open side of the body, means whereby a wire will be disposed longitudinally within the body with a single strand at one side and two strands at the opposite side of the tongue, means adjacent one end of the body for yeildably retaining the wire strands in the body, and means for rotating the body, whereby to twist the strands.

3. A mechanism for the stated purpose comprising a tubular twister body having an open side, a centrally disposed longitudinal rib within the body having its free end disposed midway the edges of the open side of the body, a yeildable looper finger mounted for rocking movement on the longitudinal axis of the body adjacent one end of the body, means for disposing a wire in strands longitudinal within the twister body at opposite sides of the rib and about the looper finger, and means for rotating the body and the rib whereby to twist the strands together.

4. A mechanism for the stated purpose comprising a tubular twister body having a central longitudinal rib disposed diametrically therein, means for disposing wire strands longitudinally through the body at opposite sides of the rib therein, means adjacent one end of the twister body for forming bights in the strands and yieldably sustaining the wire strands at the bights of the strands, said means being in constant axial alinement with the twister body, and means adjacent the opposite end of the twister body for securing and severing the wire.

5. Mechanism for the stated purpose comprising a tubular twister body having its ends mounted in fixed bearings on the side of a baling press and having an open side, a longitudinally extending diametrical rib disposed centrally in the body with its free end at the center of the open side thereof, a needle co-operating with the twister body to dispose a strand of wire longitudinally within the body at the outer side of the rib before a bale is formed and a second strand at the same side of the rib after a bale is formed, a looper finger adjacent one end of the twister body across which the wire strands pass to form bights whereby upon the formation of a bale one strand will be passed through the body at the inner side of the rib, and means adjacent the opposite end of the twister body to releasably hold one strand of wire and to simultaneously sever and secure another strand of wire.

6. A mechanism for the stated purpose comprising a tubular twister body having a longitudinal rib therein, means for disposing wire strands longitudinally through the body at opposite sides of the rib, said means including a needle carrying a free wire, means for rotating the body whereby to twist the strands together, a stationary post disposed adjacent one end of the twister body, a stationary knife arranged between said post and the end of the twister body, and a movable knife arranged to move between said post and the stationary knife whereby to sever one strand of wire against the stationary knife and bind the severed end of the free wire held by the needle against the said post.

7. A mechanism for the purpose set forth comprising a tubular twister body, fixed bearings for said body, one of said bearings having an opening through its bottom, a rock shaft mounted below said bearing transversely thereto, a finger rising from the rock shaft through the opening in the bearing, yieldable means acting on the rock shaft to rock the finger from the twister body, means for disposing wire strands within the twister body and across the finger, means to rotate the twister for twisting the wire strands, and means for severing the wire.

8. Mechanism for the purpose set forth comprising a tubular open-ended twister body, means at one end of the twister body to form a bight in wire strands disposed longitudinally in the body, means for rotating said body to twist wire strands therein about each other, a stationary knife adjacent one end of the body, a stationary post adjacent the same end of the body but more remote than the knife, a plurality of movable knives arranged to travel successively between and past said post and the stationary knife, and a needle adapted to dispose a wire strand longitudinally through the twister body and against the post whereby the movable knife will cut a twisted strand against the stationary knife and will bind the strand from the needle against the post, the withdrawal of the needle depositing a second strand longitudinally within the twister body with its end held by the post and the movable knife.

9. A mechanism for the purpose set forth comprising a tubular twister body mounted in fixed bearings on the side of a baling press and having an open side, a longitudinally disposed rib fixed in the twister body and extending diametrically across the same to the open side thereof, means for disposing a wire to be tied at opposite sides of the rib and longitudinally within the body, yieldable means near one end of the body in constant axial alinement therewith for forming a bight in the wire and holding the wire at the bight, means for rotating the twister body, and means adjacent the opposite end of the twister body for severing the twisted wire and securing the end of the free wire.

In testimony whereof I affix my signature.

JAMES O. CARROLL. [L. S.]